June 4, 1946.    G. W. WILLARD    2,401,381
REFRACTOSCOPE
Filed April 1, 1943    3 Sheets-Sheet 1
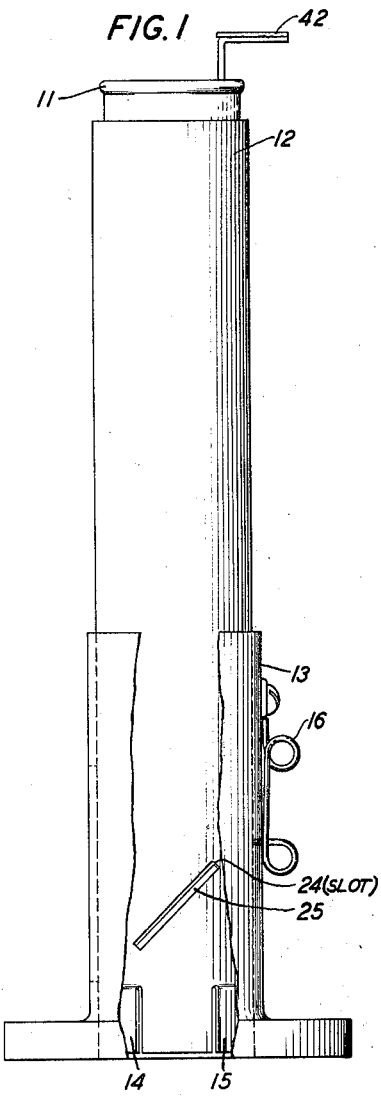
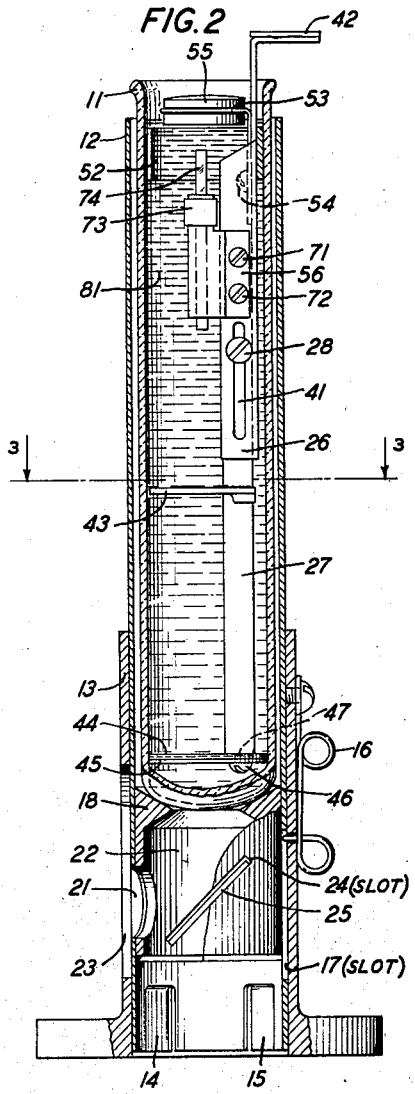
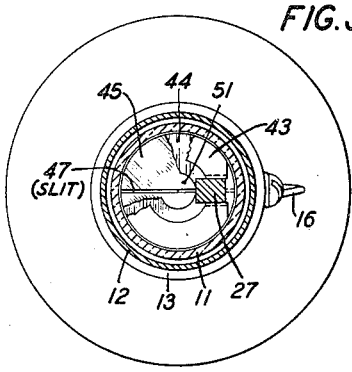
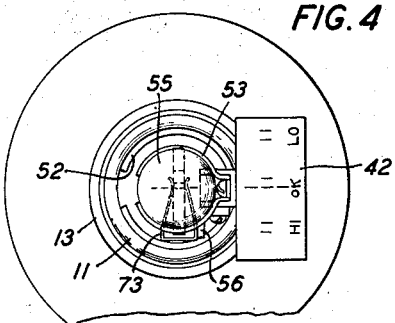
INVENTOR
G. W. WILLARD
BY
E. V. Griggs
ATTORNEY June 4, 1946.   G. W. WILLARD   2,401,381
REFRACTOSCOPE
Filed April 1, 1943   3 Sheets-Sheet 2
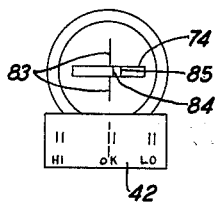
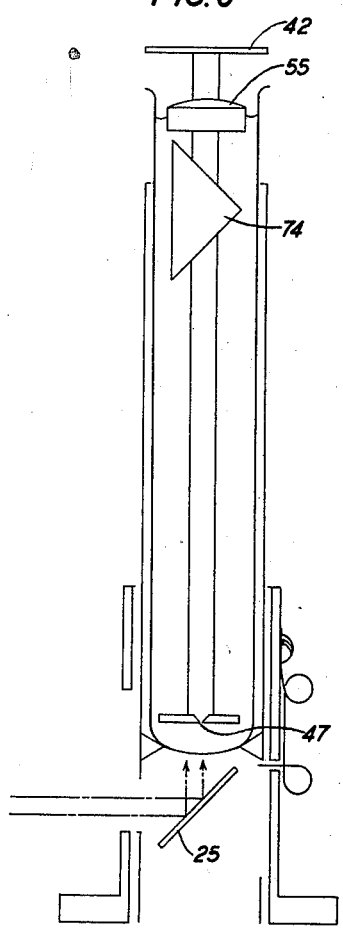
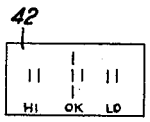
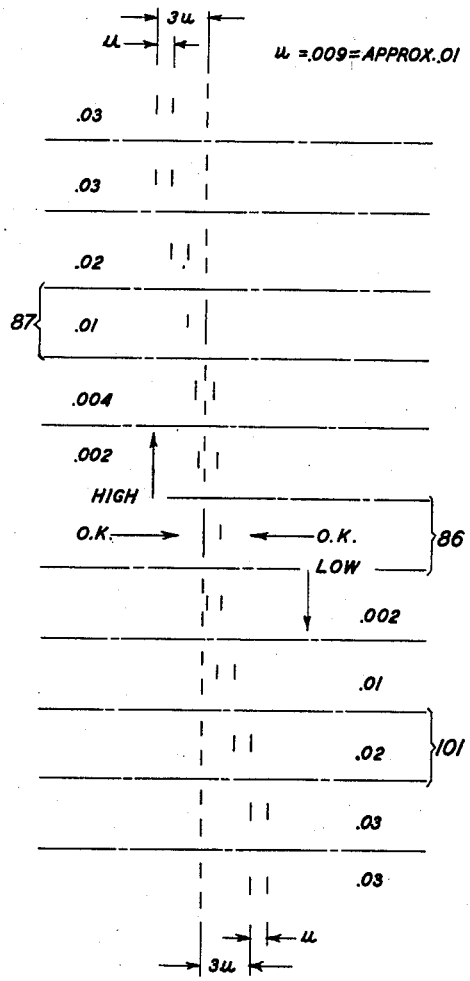
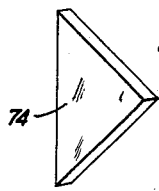
INVENTOR
G. W. WILLARD
BY
E. V. Griggs
ATTORNEY June 4, 1946.  G. W. WILLARD  2,401,381
REFRACTOSCOPE
Filed April 1, 1943  3 Sheets-Sheet 3
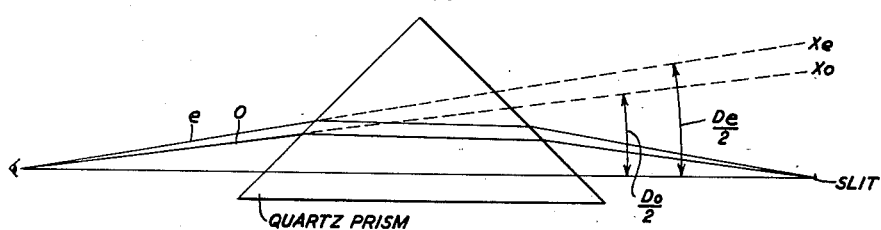
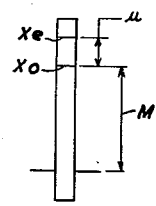
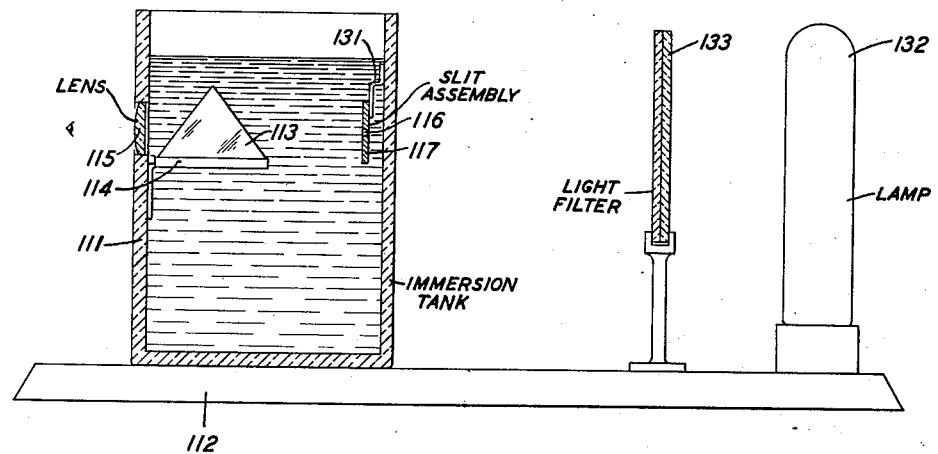
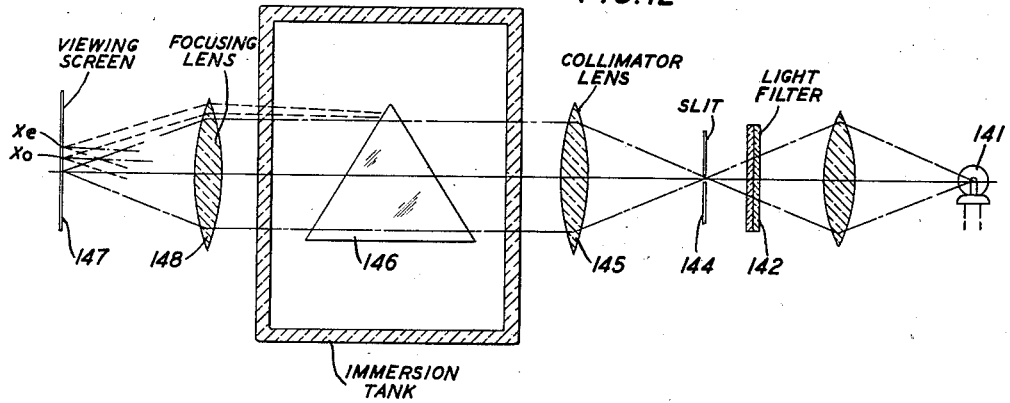
INVENTOR
G. W. WILLARD
BY
E. V. Griggs
ATTORNEY Patented June 4, 1946

2,401,381

UNITED STATES PATENT OFFICE 2,401,381

REFRACTOSCOPE

Gerald W. Willard, Fanwood, N. J., assignor to Bell Telephone Laboratories, Incorporated, New York, N. Y., a corporation of New York Application April 1, 1943, Serial No. 481,423

22 Claims. (Cl. 88—14)

This invention relates to a refractoscope and particularly to a comparison refractoscope for use with optical testing instruments of the immersion type.

In the manufacture of such objects as quartz piezo-electric crystals and the like it is common practice to utilize optical testing instruments of the so-called immersion type, the term immersion arising from the fact that in the use of such instruments the crystal or other object under examination is commonly immersed in a fluid having an index of refraction substantially the same as that of the material being examined. For example, one such instrument, an immersion conoscope, is described in Patent 2,352,072 issued June 20, 1944 to W. L. Bond, entitled "Conoscope."

In general, an immersion type conoscope usually comprises an immersion tank filled with the immersion fluid, a light source, means for filtering and polarizing the light and an optical system for passing the light rays through the solid material (such as a quartz crystal) being tested, this material being immersed in the immersion fluid within the immersion tank. A conoscope may be of the "horizontal" type as disclosed in the Bond patent, i. e., with the light source arranged horizontally with respect to the immersion tank or may be of the "vertical" type, i. e., with the light source arranged vertically (below) with respect to the tank.

Both of the above types of conoscopes are used to determine, in the material being tested, the angular orientation of the crystal axes with respect to one or more of the external surfaces of the material. Other optical instruments of the immersion type are used for inspection of interior defects in a material as well as for determining orientation of the axes thereof. In still other optical instruments the material is tested without actual immersion but with the immersion fluid flowed onto its ground or etched surfaces which in these cases are usually flat.

The purpose of placing the material to be examined in the immersion fluid, or of flowing the fluid onto the surfaces of the material is to prevent refraction, and hence bending, of the light rays as they pass through the surfaces of the material. In the case of ground or etched surfaces this refraction causes diffusion of the light and prevents sending a defined beam of light through the material, and prevents seeing into the material. A proper immersion fluid surrounding the material, or flowed onto its surface, eliminates this diffusion. In the case of curved, broken, or multisurfaced material the refraction interferes with passing defined beams of light through the specimen and even with viewing the interior. Immersion in a proper fluid obviates this difficulty. In the case of the conoscopes, use of a proper immersion fluid also eliminates the necessity for correction of angular readings for refraction errors.

To achieve the desired results in the use of the immersion instruments referred to, it is necessary that the index of refraction of the immersion fluid be the same as, or at least substantially the same as, the index of refraction of the material being inspected or tested. For some purposes the indices should be equal within one or two per cent. For other purposes the indices must be equal within one-tenth per cent. In the latter more exacting cases it is necessary that the index of the immersion fluid match that of the material under test for the particular color of light and for the temperature being used in the test, and also for a particular direction of light passage through the crystalline material.

The refractoscope of the present invention is particularly adaptable for use with and in the immersion type instruments, such as the immersion conoscope, for comparing the index of refraction of an immersion fluid with that of a material which is to be tested while immersed in said fluid under conditions of testing. However, it may also be used to advantage independently of such instruments and as a self-contained unit.

As the refractive index of the fluid may vary during use due to variable conditions, such as changing temperatures, it is desirable for the sake of accuracy that the fluid be tested under actual working conditions.

An object of the invention is to facilitate the use of optical testing instruments of the immersion type.

Another object of the invention is to facilitate the production of piezoelectric plates.

A more specific object of the inventon is to facilitate the comparison of the refractive index of a fluid with that of a solid.

In accordance with a feature of the present invention, the general arrangement of the refractoscope in accordance with one embodiment is such that it may be positioned, in use, directly in the immersion tank of an immersion type optical testing device. This is a particularly valuable feature as it permits testing the immersion fluid by the refractoscope under exactly the same conditions of light, temperature and the like as those to which the fluid is subjected during its use in the optical testing device.

In accordance with another feature of the invention, one of the elements of the refractoscope comprises a portion of the same material as that of the solid which is being compared with the immersion fluid with respect to the respective refractive indices. The element is easily removable and may be readily replaced by a similarly prepared element of a different material whereby the refractoscope is readily adaptable to use in connection with optical testing instruments which are being used for examination of several different materials such as quartz, Rochelle salt and the like.

A still further feature of the invention resides in the fact that the refractoscope contemplated thereby may be used, with slight and easily made changes, either with side illumination (as in horizontal type conoscopes) or vertical illumination (as in vertical type conoscopes).

In accordance with a further feature of the invention, the birefringence of certain birefringent materials is utilized in a novel manner to provide during the tests an indication of a constant unit of measurement as an aid in estimation of the mismatch of a liquid being tested.

In accordance with a specific embodiment of the invention, it may comprise a transparent test tube for holding the liquid to be tested, an adjustable metal stand for supporting the test tube and adapted to be placed directly in the immersion tank of an optical testing device, such as a conoscope, and the optical system which is adapted to be positioned in the test tube. The optical system includes a lens, a prism of the "comparison" material, i. e., quartz, Rochelle salt, or the like, a disc having a slit therein and means for supporting these elements of the optical system in properly spaced relationship.

In use the slit, illuminated by suitable means, is viewed both through the prism and liquid and directly through the liquid in the test tube and the images seen, when interpretated in accordance with the novel teachings of the present invention, indicate whether or not the index of refraction of the liquid matches that of the prism material and, if not, facilitate accurate estimation of the extent of mismatch. In accordance with this embodiment of the invention the prism is birefringent, i. e., double refracting, and utilization of this property in a novel manner that will be described in detail subsequently provides visual indication of a constant unit of measure.

A thorough understanding of the arrangement of the device contemplated by the present invention and of the method of using it as well as appreciation of the various desirable features thereof may be gained by consideration of the following detailed description and the annexed drawings in which:

Fig. 1 is a side elevational view of a refractoscope of the type embodying features of the present invention, a portion of the base portion being broken away;

Fig. 2 is a vertical sectional view of the refractoscope of Fig. 1, a lower portion of the holder tube assembly being shown in full;

Fig. 3 is a sectional view taken on line 3—3 of Fig. 2;

Fig. 4 is a top view of the refractoscope of Fig. 1;

Fig. 5 is a perspective view of a prism of the type utilized in the refractoscope;

Fig. 6 is a skeletonized view of the refractoscope intended to illustrate the invention schematically;

Fig. 7 is a top view of the refractoscope of Fig. 6;

Fig. 8 is a schematic representation of the effect of viewing an illuminated slit through a prism of quartz;

Fig. 9 is an end view of the quartz prism of Fig. 8;

Fig. 10 is an illustrative chart used in connection with the refractoscope;

Fig. 11 is a skeletonized view of a refractoscope intended for use as a self-contained unit and independently of other instruments; and Fig. 12 is a skeletonized top view of a refractoscope utilizing a viewing screen.

Referring now to the drawings, there is illustrated a refractoscope which embodies features of the present invention and which we will assume, merely as one example of the uses thereof, is to be used in checking the refractive index of the immersion liquid being used in a conoscope of the type disclosed in the Bond patent referred to above; it will also be assumed that the conoscope is being used for examination of quartz crystals by passing polarized, green, mercury light (i. e., light produced by a mercury type light source and having all the colors of its spectrum filtered out except green) through the crystals in a direction parallel to the optical axis of the respective crystal. The refractoscope illustrated comprises a test tube 11, of glass or other suitable transparent material, removably supported in a test tube holder tube 12 of brass or other suitable material. Holder tube 12, in turn is supported by tube base 13; tube 12 may be raised or lowered in holder base 13 between limits, slotted portions, as 14 and 15, being provided in the lower end of holder tube 12 to produce a snug sliding fit between holder tube 12 and the adjacent surface of base 13. The limits of the relative motion of the holder tube 12 in base 13 are established through engagement of the free end of biased spring arm 16 in vertical slot 17 provided in holder tube 12. Holder tube 12 may be removed from base 13, upon occasion, after withdrawal of the projecting end of biased spring arm 16 from slot 17.

When the test tube 11 is in position in holder tube 12, the bottom of the test tube rests on circular shoulder 18 of holder tube 12; the shoulder is provided with a relatively large, centrally positioned, aperture for passage of light.

Aperture 21 which is provided in the side wall of holder tube 12 communicates with hollow chamber 22 provided in the holder tube below shoulder 18 while vertical slot 23 of base 13 serves to admit light to aperture 21 and chamber 22 regardless of the adjusted position (within the limits referred to) of holder tube 12 in base 13. Angular slots are provided at diametrically opposite points in the lower side wall of holder tube 12 (one of these slots, 24, is shown); light reflector plate 25 is supported by these two slots being removable therefrom or replaceable therein only when holder tube 12 has been removed from base 13.

As shown most clearly in Fig. 2, an optical system is removably positioned as a unit in test tube 11. The supporting structure of this optical system includes a channel shaped member 26 and a rod 27 adjustably connected thereto by threaded bolt 28 which is carried by rod 27 and rides in slot 41 provided in channel member 26. The upper end of channel member 26 is bent at right angles to the main length and serves to support outside of the test tube a "reminder tab" 42 the purpose of which will be described subsequently. This bent portion of channel member 26 also serves as a handle when the optical system is being inserted in or removed from test tube holder tube 12.

A ring shaped light shield 43 is supported by rod 27 just below the lower end of channel member 26 which the optical slit assembly is supported at the lower extremity of rod 27. This slit assembly (Figs. 2 and 3) comprises two discs 44 and 45 superimposed one on the other and attached to rod 27 by bolt 46. The lower disc 45 has a relatively narrow slit 47 therein (the defining walls of the slit may be tapered inward, if desired to the slit proper the width of which may be of the order of .002 to .003 inch) while the upper disc 44 is provided with a centrally positioned aperture 51 the diameter of which may be of the order of .250 inch.

A ring shaped spring member 52 is supported by channel member 26 near the upper end thereof; when the optical system is in position within test tube 11 the outer wall surfaces of spring 52 snugly engage the inner wall surface of test tube 11 thus serving to maintain the proper position of the optical system in the test tube.

A spring lens holder 53 is attached to channel member 26 (near the upper end thereof) by screw 54; the free end of lens holder 53 is bent at right angles to the vertical axis of channel member 26 and is adapted to support plano-convex lens 55 in the mouth of test tube 11. Lens 55 serves two purposes; it prevents ripples on the surface of the liquid being examined and acts as a magnifier to permit high sensitivity (i. e., large displacement of lines) in a short space. It will be observed that the surface of the lens which contacts the liquid is flat.

Bracket 56 is attached to channel member 26 by screws 71 and 72; bracket 56 and spring clip 73 carried thereby serve to support prism 74. A groove of sufficient width to just receive the edge of prism 74 is provided on the inner surface of bracket 56 and the free ends of clip 73 are biased to bear against the sides of the prism with sufficient pressure to hold it.

The general manner in which prism 74 (Figs. 5 and 6) is mounted in the refractoscope is indicated in Fig. 6; the material of the prism as well as the exact manner of its production will vary in accordance with the material being tested in the immersion instruments. It was set forth in the early part of the detailed description that it would be assumed for purposes of description that the refractoscope is being used to check the refractive index of the immersion fluid being used in an immersion conoscope which, in turn, is being used for examination of quartz crystals by passing polarized light through the crystals in a direction parallel to the optical axis of the respective crystal. It will be assumed, further, that green mercury light is being used in the conoscope and that the approximate temperature of the immersion liquid is 18° C. What we actually wish to ascertain by the tests is how nearly the index of refraction of the immersion fluid matches that of the quartz. (For an ideal condition during use of a conoscope of the immersion type, the refraction index of the immersion fluid exactly matches that of the material being examined.) For such use prism 74 should be of quartz of the Z-cut type, i. e., cut from the raw quartz crystal with its major faces perpendicular to the optical or Z axis of the quartz. (Orientation with respect to the electrical and mechanical axes of the crystal is not of significance.) As is evident from Fig. 5, prism 74 is comparatively narrow so that as the observer sights down through lens 55 the slit 47 will be "seen" on each side of the prism. As will be further discussed at another point in the description, prisms of different material will be used from time to time in the refractoscope when different materials than quartz are being tested or checked in the conoscope (with the attendant use of a different immersion fluid). The arrangement of the prism holder provided is such that prism 74 may be easily removed and a prism of different material substituted therefor providing, of course, that the other prism is of substantially the same size and shape as prism 74.

Let us assume now that test tube 11 be filled with immersion liquid 81, for example, by dipping the test tube into the immersion tank of the conoscope. Among the liquids found suitable for use in an immersion conoscope for examination of quartz is a mixture of dimethyl phthalate and dichlor naphthalene in the approximate proportions (by weight) of 73.9 and 26.1 respectively and it will be assumed that liquid 81 is of such composition. The entire assembly is now placed in the immersion tank of the conoscope in such position that the polarized light transmitted through the conoscope optical system will pass through slot 23 and aperture 21 (Fig. 2) into chamber 22 and be reflected by mirror 25 to slit 47 of the optical slit assembly supported by rod 27. The observer now peers through lens 55 and for description of what is seen and the proper interpretation thereof reference should now be had for the moment to Figs. 6 to 10.

Referring first to Figs. 8 and 9, let us assume that an illuminated slit designated "Slit" is being viewed through a quartz prism, designated "Quartz prism," and the surrounding medium which we will assume to be an immersion liquid and is also being viewed through the liquid alone on both sides of the prism. (The prism as indicated by Figs. 5 and 9 is relatively narrow.) With respect to the image of the slit as viewed through the prism and liquid, the well-known laws of prisms will of course apply, i. e., that objects seen through a prism appear deflected towards its apex when the surrounding medium is of lower index, and toward the base when of higher index. Further, quartz being a uniaxial material and birefringent, two deflected images $X_e$ and $X_o$ of the slit as viewed through the prism and liquid will be seen resulting respectively from the extraordinary ray ($e$) and the ordinary ray ($o$).

Now, assuming that the quartz prism has been cut from the mother crystal as above described, i. e., cut perpendicularly to the optical or Z axis, it will present to light passing therethrough parallel to its base two indices of refraction, one index being equal to that along the optical axis of the quartz (the one we wish to match) and the other index being different. Thus we have one index, $N_o$, for the ordinary ray which is equal to the index along the optical axis and another index, $N_e$, which is different (greater in quartz). It will be apparent that since the angles of deviation $D_e$ and $D_o$ are small, and approach zero, in practice the following equations can be written:

$$\frac{M}{u} = \frac{D_o}{D_e - D_o} = \frac{N_o - N_1}{N_e - N_o} = \frac{\Delta N_m}{\Delta N_{eo}}$$

$\Delta N_m = N_o - N_1 =$ mismatch of liquid and quartz
$\Delta N_{eo} = N_e - N_o =$ difference between index for $e$ and $o$ in quartz. ($N_1$ being the index of refraction of the surrounding medium, i. e., the immersion liquid, and $M$ and $u$ being as shown on Fig. 9.)

Now in quartz for green mercury light ($\lambda = 5461$ Angstroms) at 18° C.:

$$N_e = 1.5554$$
and: $$N_o = 1.5462$$
therefore: $$\overline{\Delta N_{eo}} = .0092 \doteq .009 \doteq .01$$
$$\Delta N_m \doteq \frac{M}{u} .01$$

As the operator looks at illuminated slit 41 through the optical system, therefore, assuming that the slit is illuminated by the green mercury light, he will ordinarily see three parallel green lines, one long and usually broken in the middle (line 83, Fig. 7) corresponding to the slit as seen unrefracted through immersion liquid 81 along each side of prism 74 and two short lines (lines 84 and 85, Fig. 7) corresponding to the slit as seen refracted through both prism 74 and liquid 81 (ordinary and extraordinary rays).

It might be noted that because of the very small angles of deviation, $D_e$ and $D_o$, involved (due to the small mismatch of indices that will be measured), and due to the comparative nature of the readings obtained, it is not necessary in practice that the slit be viewed through the prism in such a manner that the rays pass exactly parallel to the base as shown in Fig. 8 and described above.

Reminder tab 42, referred to heretofore, has been provided to assist in the interpretation of the "lines" seen; with the tab toward the observer, the three green lines referred to above will be spaced similarly to one of the views of the chart of Fig. 10. It will be observed that the distance between the two short lines does not change regardless of their position with respect to the slit line. This is the distance $u$ (Fig. 9) or $N_e - N_o$ which was found to be .0092, or for our present purposes, the substantially equal value .01. The variable separation between the long line and the left-hand short line is a measure of the mismatch of the quartz and the immersion liquid with respect to refraction indices.

The constant separation of the two short lines and knowledge that this separation represents a unit of measure of index differences substantially equivalent to .01 greatly facilitates estimation of the mismatch represented by the various spacings encountered during the observations; the chart of Fig. 10 represents typical spacings. When the long line and the left-hand short line coincide (space 86, Fig. 10) an exact match (within error of reading) of the refractive indices of quartz and liquid is indicated while when the left-hand short line is to the left of the long line the index of the liquid is too high and when to the right the index of the liquid is too low. For example, space 87 indicates the liquid is too high by .01 as the separation between the left-hand short line and the long line is the exact distance between the two short lines and said left-hand short line is to the left of the long line while space 101 indicates the liquid is too low by .02 as here the left-hand short line is to the right of the long line a distance approximately twice the distance between the two short lines. As the match between the liquid index and that of the quartz improves the bending of the rays will be progressively eliminated and the spacing between the long line and the pair of short lines will progressively diminish.

It might be noted that when the conoscope is used for testing quartz and when it gives a reading of 50 degrees (in common usage the readings are seldom larger) the immersion fluid must match the quartz to $\frac{1}{5}$ $u$ in the refractoscope in order that the conoscope have less refraction error than $\frac{1}{10}$ degree. This degree of match is entirely within the capabilities of the above shown refractoscope, which actually should allow matching the fluid to the quartz well within $\frac{1}{10}$ unit $u$.

It will be noticed that reminder tab 42 is not an index but merely a reminder or assistor in interpretation of the readings; for example, it reminds the instructed observer which of the indications are high, correct or low (Hi, OK, Lo) and which of the two short lines (the left one) is the proper one for matching the long line.

It will be readily apparent that the novel arrangement whereby the two constantly spaced short lines are seen is particularly valuable as a ready "measure" is thereby provided whereby the spacing representative of the index mismatch may be readily estimated. With very little practice the average observer will be able to estimate the amount of mismatch well within the limits of accuracy that are required for testing immersion fluids.

It is common practice to produce a satisfactory immersion liquid by mixing two liquids together (one having a refractive index that is "too high" and the other an index that is "too low") until a combination is arrived at that has the exact index of refraction that is required. The refractoscope of the present invention is particularly adaptable to use in testing the liquids from time to time as the two are mixed in order to determine when the perfect match has been reached. It is also adapted for use in testing "perfect" liquids from time to time during use; it has been found that the index of the immersion liquid may change during use due to selective evaporation of one of the ingredients or through pollution or dilution. That is the arrangement contemplated by the present invention is equally adaptable to testing fluids in preparation, in storage or in actual use.

It might further be noted that when a mismatch is observed it is easy, with proper tables, to compute the correction additions to the fluid necessary to bring about a match between the fluid index and that of the quartz. For example, when the above-mentioned immersion fluid gives a reading of 1 $u$ too low, it is necessary to add approximately 18 parts of dichlor-naphthalene to 100 parts of the mixed fluid, and when the reading is 1 $u$ too high, to add 44 parts of dimethyl phthalate, to bring the mixture back to a match. For less than one unit mismatch proportionately smaller additions are made.

In the above description it has been assumed that the refractoscope is being used in connection with a horizontal type conoscope of the type disclosed in the Bond patent referred to, i. e., one in which the light source is arranged horizontally with respect to the immersion tank. However, the refractoscope is equally adaptable for use in a vertical type conoscope, i. e., the type wherein the light source is arranged below the immersion tank. In the event of such use it is necessary only to remove light reflector plate 25 (Figs. 1 and 2) from the assembly whereupon light may be passed vertically up through the lower end of holder tube 12 for illumination of slit 47; plate 25 may be readily removed or replaced if tube holder 12 is first removed from base 13.

It may sometimes transpire that, when the refractoscope is used in conjunction with conoscopes or polarized light immersion tubes, there may be a complication due to polarization of the light entering the refractoscope. This complication is overcome by the particular manner of design shown. It will be realized by one versed in the art that when light entering the prism is plane polarized parallel, or perpendicular, to the major surfaces of the prism one or the other of the two rays normally passing through the prism will be eliminated thus leaving in view only the long slit line and one short refracted line. When this condition occurs it may be overcome merely by rotating the test tube (and hence the inside optical system) to the right or to the left until both short lines appear (to obtain exactly equal intensities a rotation of 45 degrees would be made).

It will be understood, of course, that immersion type instruments are used for the optical testing of various materials and that different immersion fluids will be used for testing different materials. As the refractoscope of the present invention is to be used in comparing the index of refraction of an immersion fluid with that of the material being tested in the immersion type optical instrument it will be understood that the material of prism 74 will, in general, be that of the solid which is to be examined by use of the particular immersion liquid being tested in the refractoscope, or at any rate, will be of a material having a like index of refraction. That is, in the arrangement described above, prism 74 is of quartz, cut in a particular manner, in view of the assumption that the immersion liquid 81 is to be used in a particular examination of quartz crystals. On the other hand, if the immersion liquid being checked were to be used in connection with the examination of Rochelle salt crystals, prism 74 would be replaced by a prism of Rochelle salt cut from a mother crystal in a manner determined by the orientation of the crystals when examined in the immersion testing device.

In common practice a Rochelle salt crystal (a biaxial material) is viewed in the conoscope along both optic axes. One manner of cutting the Rochelle salt prism that renders it especially suitable for use in the present refractoscope is as follows: The major surfaces of the prisms are made perpendicular to the plane of the two optic axes of the crystal and the base of the prism made parallel to the bisector of the optic axis. In this case reminder tab 42 as used above for quartz is still correct for Rochelle. However, the unit of mismatch is now approximately .003, instead of approximately .01.

As pointed out above the construction of the prism holder is such that the prisms are readily replaceable.

Prisms of various "prism angles" may be utilized as desired. If the prism angle is small (say 30 degrees) the sensitivity will be low although a larger mismatch could be observed while if the prism angle is large (say 120 degrees) the sensitivity will be high but only a small range of mismatch will be visible. In the specific example described above and illustrated in the drawings, a prism angle of approximately 90 degrees has been assumed.

While the above detailed description has been largely devoted to an embodiment of the invention which is intended primarily for use in connection with optical testing devices of the immersion type such, for example, as the conoscope wherein use is made for illumination of the slit of the light source, filter, etc. of the conoscope, the invention is not, of course, so limited in its application and the description has been so worded merely because the embodiment described is a particularly valuable one and probably the one which will be most widely used. It should be understood that the basic and novel features of the invention may be incorporated in various other forms. For example, there is shown in Fig. 11 a schematic representation of an embodiment of the invention wherein a light source and filter are provided as a part of the refractoscope assembly.

Referring to Fig. 11 this embodiment of the invention comprises a suitable container 111 of glass or other transparent material mounted on a base 112. Prism 113, which may be similar in material and method of preparation to prism 74 referred to above, is mounted by means of a suitable supporting arm 114 in alignment with lens 115 and slit 116. Slit 116 is provided in disc 117 which is supported by arm 131. (The lens and/or slit might be externally mounted if the glass walls are sufficiently flat and uniform. Also the lens might be dispensed with, or a multiple lens unit might be used for greater sensitivity.) Also supported on base 112 are lamp 132 and light filter 133, the latter being designed to filter out from the light produced by lamp 132 all portions of the spectrum except that part or parts desired for illumination of the slit. As in the instance of the embodiment previously described in detail, the immersion fluid to be tested is placed in container 111 to a sufficient depth to cover prism 113 and the illuminated slit is viewed both through the fluid alone and through both prism and fluid.

If desired the arrangement may be used without light filters in which event the separation of the two short lines may be taken as the separation of the same color portions of the two spectrums into which the two short lines will expand. Also the slit may be replaced by another type of aperture or a cross-hair may be utilized instead of an aperture. Applicant at this point uses the term "fiducial mark" as a comprehensive designation of the slit, cross-hair or the like.

It is contemplated also that even a simpler arrangement than that illustrated in Fig. 11 may be used for occasional tests, i. e., one in which prism 113 (Fig. 11) may not be provided and in which the observer merely sights at the illuminated slit through a piece of quartz (or other material as dictated by the nature of the test) held in line with the eye while immersed in a fluid within a transparent tank. The material should, of course, be birefringent and should have a distinct section having two sloping sides corresponding to the two inclined sides of the prism in order that the property of birefringency may be utilized in the observations.

It is also contemplated that the arrangement may be modified whereby images of the illuminated slit are projected onto a screen for viewing. A skeletonized top view of such an arrangement is furnished in Fig. 12. Light from lamp 141 is passed through light filter 142 and that part of the spectrum passed is focused upon slit 144 and passes through the slit, through collimator 145, through prism 146 and is focused upon viewing screen 147 by lens 148. It will be understood that the immersion fluid being tested fills the immersion tank to a sufficient depth to cover prism 146.

Collimator lens 145 acts to form the light rays into a parallel group of rays of sufficient width to extend a relatively short distance on each side of prism 146. We have projected onto screen 147, therefore, similar "lines" to those previously referred to, i. e., a long broken line corresponding to portions of the light ray group passing to each side of prism 146 (i. e. light passing only through the liquid in the tank) and two short lines resulting from the rays which pass both through the liquid and the prism. (Prism 146 is of a birefringent material and the property of birefringence is utilized, as before, to provide the two short, constantly spaced, lines.)

Certain advantages of the arrangements of the present invention have been specifically mentioned above and others will have become apparent during consideration of the description. It will be apparent, for example, that there is nothing critical about the optical system since no scale is utilized. While the focal length of the lens will change slightly with changes in the refractive indices of the liquids, this does not interfere with the accuracy of the readings inasmuch as the lens is used only as a magnifier. Changes in distance of viewing (position of observer) likewise make no difference, so long as the slit is sharply visible to the observer, as such changes contract or expand the whole field ($u$ and $M$ proportionately).

In general the embodiments of the invention described above have been based upon the use of a prism of a birefringent material and utilization of this property of birefringence in a novel manner whereby the two constantly spaced short lines are seen during the test. However, if it be desired to match the refractive index of a fluid with that of a nonbirefringent material, such as glass, an equivalent result may be achieved by using two relatively thin, identically shaped, prisms of non-birefringent material positioned with a major face of each together, one of the prisms being of the material to be compared for index match and the other prism being of a material having a refractive index which differs from that of the first material by an amount which will produce an appropriate unit of measure for estimating the mismatch (i. e. the unit of measure referred to here compares to $u=.01$ as described above).

Further, the invention contemplates the comparison of the refractive index of one solid material with that of a second solid material (or of the same solid in a different orientation) by mounting a prism of each material with a major surface of each together and aligned, immersing the prisms in a suitable fluid and viewing the assembly as described above.

It is contemplated also that a series of birefringent prisms, or pairs of singly refringent prisms, might be used to determine indices of a variety of fluids or the variation of index of a fluid with respect to temperature, adulteration or the like.

While specific embodiments of the invention have been selected for illustration and detailed description, the invention is not, of course, limited in its application to such specific embodiments. For example, the optical assembly may be used without the test tube in deep immersion tanks such as that of the vertical conoscope and the optical system, further, need not be arranged horizontally or vertically, as illustrated, but may be arranged at any convenient angle. In short embodiments described should be looked upon as illustrative of the invention and not as restrictive thereof.

What is claimed is:

1. A device for comparing the refractive index of a fluid with that of a solid material comprising a transparent container for holding a quantity of said fluid, a prism of said solid material, a plate having an aperture therein, the aperture being adapted to be illuminated, and means for supporting said plate and said prism within said container, said prism being so shaped and so positioned with respect to the shape and the position of the aperture that the aperture when illuminated may be simultaneously viewed both directly through said fluid in said container and through said prism and said fluid, said prism being double refracting whereby relatively displaced images of the aperture are produced thereby, said displaced images being parallel to each other and to the image of the aperture as viewed directly through said fluid.

2. A device for comparing the refractive index of a fluid with that of a solid birefringent material comprising a transparent container for holding a quantity of said fluid, a prism of said solid birefringent material, a plate having a slit therein, the slit being adapted to be illuminated, means for supporting said prism and said plate within said container, said prism being so shaped and so positioned with respect to the shape and the position of the slit that the slit when illuminated may be simultaneously viewed both directly through said fluid in said container and through said prism and said fluid, said prism producing relatively displaced images of the slit, said displaced images being parallel to each other and to the image of the slit as viewed directly through said fluid.

3. An optical device for comparing the refractive index of a birefringent material with that of a fluid comprising a transparent container for holding a quantity of said fluid, a prism of said birefringent material, a plate having an aperture therein, the aperture being adapted to be illuminated, and means for supporting said plate and said prism in said container, said prism being so shaped and so positioned with respect to the shape and the position of the aperture that the aperture when illuminated may be simultaneously viewed both directly through said fluid in said container and through said prism and said fluid, said prism producing relatively displaced images of the aperture, said displaced images being parallel to each other and to the image of the aperture as viewed directly through said fluid.

4. A device for comparing the refractive index of a liquid with that of a solid material comprising a transparent test tube for containing a quantity of said liquid, a prism of said solid material, a plate having a slit therein, the slit being adapted to be illuminated, and means for supporting said plate and said prism in said test tube, said prism being so shaped and so positioned with respect to the shape and the position of the slit that the slit when illuminated may be simultaneously viewed both directly through said liquid in said test tube and through said prism and said liquid, said prism being double refracting whereby relatively displaced images of the slit are produced thereby, said displaced images being parallel to each other and to the image of the slit as viewed directly through said liquid.

5. A device for comparing the refractive index of a liquid with that of quartz crystals comprising a transparent container for holding a quantity of said liquid, a prism cut from a quartz crystal, a plate having a slit therein, the slit being adapted to be illuminated, and means for supporting said plate and said quartz prism in said container, said prism being so shaped and so positioned with respect to the shape and the position of the slit that the slit when illuminated may be simultaneously viewed both directly through said liquid in said container and through said quartz prism and said liquid, said quartz prism being double refracting whereby relatively displaced images of the slit are produced thereby, said displaced images being parallel to each other and to the image of the slit as viewed directly through said liquid.

6. An optical device for comparing the refractive index of a birefringent material with that of a fluid comprising a transparent container for holding a quantity of said fluid, a prism of said birefringent material, an illuminated fiducial mark, and means for supporting said prism and said fiducial mark within said container, said prism being so shaped and so positioned with respect to the shape and the position of the fiducial mark that said mark may be simultaneously viewed both directly through said fluid in the container and through both said prism and said fluid, said prism being so cut from a portion of said birefringent material as to give a pair of constantly spaced images of the mark, said spaced images being parallel to each other and to the image of the mark as viewed directly through said fluid.

7. A device for comparing the refractive index of a liquid with that of Rochelle salt crystals comprising a transparent container for holding a quantity of said liquid, a prism cut from a Rochelle salt crystal, a plate having a slit therein, the slit being adapted to be illuminated, and means for supporting said plate and said Rochelle salt prism in said container, said prism being so shaped and so positioned with respect to the shape and the position of the slit that the slit when illuminated may be simultaneously viewed both directly through said liquid in said container and through said Rochelle salt prism and said liquid, said Rochelle salt prism being double refracting whereby relatively displaced images of the slit are produced thereby, said displaced images being parallel to each other and to the image of the slit as viewed directly through said liquid.

8. A device for comparing the refractive index of a liquid with that of quartz piezoelectric crystals comprising a transparent test tube for holding a quantity of said liquid, a prism cut from a quartz crystal perpendicularly to the optical axis of the crystal, a plate having a slit therein, the slit being adapted to be illuminated and means for supporting said prism and said plate within said test tube, said prism being so shaped and so positioned with respect to the shape and the position of the slit that the slit when illuminated may be simultaneously viewed both directly through said liquid in said test tube and through said quartz prism and said liquid, said prism being double refracting whereby relatively displaced images of the slit are produced thereby, said displaced images being parallel to each other and to the image of the slit as viewed directly through said liquid.

9. A device for comparing the refractive index of a fluid with that of a crystalline material comprising a transparent container for holding a quantity of said fluid, a prism cut from said crystalline material, a plate having a slit therein, the slit being adapted to be illuminated and means for supporting said plate and said prism in said container, said prism being so shaped and so positioned with respect to the shape and the position of the slit that the slit when illuminated may be simultaneously viewed both directly through said liquid in said container and through said prism and said liquid, said prism being cut from said crystalline material in such a direction that a light ray incident upon said prism results in two distinct refracted rays whereby relatively displaced images of the slit are produced by viewing through said prism, said displaced images being parallel to each other and to the image of the slit as viewed directly through said liquid.

10. A refractoscope for comparing the refractive index of a solid with that of a fluid comprising a transparent test tube for containing portions of the fluid and the solid to be compared, a tubular casing for encompassing and supporting said test tube, and a base member for removably supporting said casing in a vertical position, said casing and said base member having apertures therein for admission of light rays projected at right angles to the longer axis of said test tube and said casing, the apertures being so positioned that an aperture of said casing is in registry with an aperture of said base member when said casing is in position to be supported by said base member, reflecting means for directing light admitted through said apertures into said test tube, said casing being capable of vertical adjustment within limits in said base member while maintaining registry of the previously referred to apertures, said base member having an additional aperture therein for admission of light rays projected parallel to the longer axis of said test tube and said casing, the last-mentioned aperture being so located with respect to said test tube when supported by said casing and said base member that light rays admitted through the last-mentioned aperture are directed into said test tube through the bottom wall thereof.

11. A device for comparing the refractive index of a liquid with that of a solid material comprising a transparent tubular container for holding a quantity of the liquid, means for supporting said tubular container in a vertical position, and an optical system removably supported in said container as a unit, said optical system comprising a plano-convex lens, a prism of said solid material, a disc having a slit therein and means for supporting said lens, prism and disc in spaced relationship whereby, when said optical system is in position in said tubular container, said lens is positioned near the top of said container, said disc is positioned near the bottom of said container and said prism is located intermediate of said lens and said disc, said prism being so shaped with respect to the slit that the slit may be viewed both through said lens and said liquid alone and through said lens, said prism and said liquid, said prism being double refracting whereby two relatively displaced images of the slit are produced thereby.

12. A device for comparing the refractive index of a liquid with that of quartz piezoelectric crystals comprising a transparent tubular container for holding a quantity of the liquid, a prism cut from a quartz piezoelectric crystal with the major faces thereof perpendicular to the optical axis of the crystal, a plate having a slit therein, the slit being adapted to be illuminated, a plano-convex lens, means for supporting said lens within said container near the top thereof with the flat surface of said lens in position to contact the surface of the liquid in the container, means for supporting said plate within said container near the bottom thereof and means for supporting said prism intermediate of said lens and said plate, said prism being so shaped with respect to the slit that the slit when viewed through said lens may be seen both directly through said liquid in said container and through said prism and said liquid, said prism being double refracting whereby relatively displaced images of the slit are produced thereby.

13. A device for comparing the refractive index of a liquid with that of quartz piezoelectric crystals comprising a transparent tubular container for holding a quantity of the liquid, a prism cut from a quartz piezoelectric crystal with the major faces thereof perpendicular to the optical axis of the crystal, a plate having a slit therein, the slit being adapted to be illuminated, a plano-convex lens, means for supporting said lens within said container near the top thereof with the flat surface of said lens in position to contact the surface of the liquid in the container, means for supporting said plate within said container near the bottom thereof and means for supporting said prism intermediate of said lens and said plate, said prism being so shaped with respect to the slit that the slit when viewed through said lens may be seen both directly through said liquid in said container and through said prism and said liquid, said prism supporting means being of a biased spring clamping type to permit ready removal and replacement of a prism, said prism producing relatively displaced images of the slit.

14. A device for comparing the refractive index of a liquid with that of quartz piezoelectric crystals comprising a transparent tubular container for holding a quantity of the liquid, a prism cut from a quartz piezoelectric crystal with the major faces thereof perpendicular to the optical axis of the crystal, a plate having a slit therein, the slit being adapted to be illuminated, a plano-convex lens, means for supporting said lens within said container near the top thereof with the flat surface of said lens in position to contact the surface of the liquid in the container, means for supporting said plate within said container near the bottom thereof and means for supporting said prism intermediate of said lens and said plate with the longer dimension of the base thereof parallel to the vertical axis of said container, said prism being so shaped with respect to the slit that the slit when viewed through said lens may be seen both directly through said liquid in said container and through said prism and said liquid, said prism being double refracting whereby relatively displaced images of the slit are produced thereby.

15. A refractoscope of the type adapted for use in connection with immersion type conoscopes for comparing the index of refraction of the immersion liquid being used in the conoscope with the index of refraction of the solid material being examined in the conoscope comprising a transparent test tube for containing a quantity of said immersion liquid, means adapted to support said test tube in vertical position in the immersion tank of a conoscope, a plate within said test tube, said plate having a slit therein, said slit being adapted to be illuminated by the light source of the conoscope, a prism of said solid material and means for supporting said prism within said test tube above said plate, said prism being so positioned and so shaped with respect to the slit that the slit when illuminated may be viewed both directly through said liquid in said test tube and through said prism and said liquid, said prism being double refracting whereby relatively displaced images of the slit are produced thereby.

16. A refractoscope of the type adapted for use in connection with immersion type conoscopes for comparing the index of refraction of the immersion liquid being used in the conoscope with the index of refraction of the solid material being examined in the conoscope comprising a transparent test tube for containing a quantity of said immersion liquid, means adapted to support said test tube in vertical position in the immersion tank of a conoscope, a plate within said test tube, said plate having a slit therein, means for reflecting light from the light source of the conoscope through the slit for illumination thereof, a prism of said solid material and means for supporting said prism within said test tube above said plate, said prism being so positioned and so shaped with respect to the slit that the slit when illuminated may be viewed both directly through said liquid in said test tube and through said prism and said liquid, said prism being double refracting whereby relatively displaced images of the slit are produced thereby.

17. A device for comparing the refractive index of a liquid with that of a solid material comprising a transparent tubular container for holding a quantity of the liquid, means for supporting said tubular container in a vertical position, and an optical system removably supported in said container as a unit, said optical system comprising a plano-convex lens, a prism of said solid material, a disc having a slit therein and means for supporting said lens, prism and disc in spaced relationship whereby, when said optical system is in position in said tubular container, said lens is positioned near the top of said container, said disc is positioned near the bottom of said container and said prism is located intermediate of said lens and said disc, said prism being so shaped with respect to the slit that the slit may be viewed both through said lens and said liquid alone and through said lens, said prism and said liquid, an extension arm carried by said last-mentioned supporting means, a portion of said arm being positioned outside of said container when said optical system is positioned therein and serving as a handle for manipulation of said optical system and an instruction chart mounted on said portion of said arm.

18. The method of comparing the refractive index of a liquid with that of quartz piezoelectric crystals which includes the steps of viewing an illuminated slit both directly through a quantity of said liquid and through both a prism and a quantity of said liquid, said prism being cut from a quartz piezoelectric crystal in such a manner that a light ray incident upon said prism produces an ordinary refracted ray and an extraordinary refracted ray whereby two images of the slit as viewed through said prism are seen, the separation between said two images being a constant value dependent upon the difference between the respective indices of refraction of said prism for the extraordinary and the ordinary rays, said two images of the slit seen as viewed through said prism being parallel to each other and to the image of the slit seen as viewed through said liquid alone, observing the distance between one of said two images and the image of the slit as seen through said liquid alone and using the constant distance between said first two images as a unit of measure to aid in estimation of the distance between said one of said first two images and said image of the slit as seen through said liquid alone.

19. The method of comparing the refractive index of a birefringent material with that of a fluid which comprises viewing a straight fiducial mark both directly through a quantity of said fluid and through both a quantity of said fluid and a portion of said birefringent material, a light ray incident upon said portion of birefringent material producing an ordinary refracted ray and an extraordinary refracted ray whereby two images of the mark as viewed through said portion of birefringent material are seen, the first of said two images resulting from the ordinary ray and the second of said two images resulting from the extraordinary ray, the separation between said two images being dependent upon the difference between the respective indices of refraction of said portion of birefringent material for the ordinary and the extraordinary rays, said portion of birefringent material being so shaped and so positioned with respect to the fiducial mark that said two images are parallel to each other and to the image of the fiducial mark seen as viewed through the fluid alone, estimating the distance between said first of said two images and the image of the fiducial mark as seen through the fluid alone and using the distance between said first of said two images and said second of said two images as a unit of measure in estimating the distance between said first of said two images and said image of the fiducial mark as seen through the fluid alone.

20. The method of comparing the refractive index of a birefringent material with that of a fluid which comprises viewing an illuminated slit both directly through a quantity of said fluid and through both a quantity of said fluid and a portion of said birefringent material, a light ray incident upon said portion of birefringent material producing an ordinary refracted ray and an extraordinary refracted ray whereby two images of the slit as viewed through said portion of birefringent material are seen, the first of said two images resulting from the ordinary ray and the second of said two images resulting from the extraordinary ray, the separation between said two images being dependent upon the difference between the respective indices of refraction of said portion of birefringent material for the ordinary and the extraordinary rays, said portion of birefringent material being so shaped and so positioned with respect to the slit that said two images are parallel to each other and to the image of the slit seen as viewed through the fluid alone, estimating the distance between said first of said two images and the image of the slit as seen through the fluid alone, and using the distance between said first of said two images and said second of said two images as a unit of measure in estimating the distance between said first of said two images and said image of the slit as seen through the fluid alone.

21. The method of comparing the refractive index of a birefringent material with that of a fluid which comprises immersing a prism of said material in a quantity of said fluid, observing an illuminated slit both directly through said fluid and through both said fluid and said prism, a light ray incident upon said prism of birefringent material producing an ordinary refracted ray and an extraordinary refracted ray whereby two images of said illuminated slit as viewed through said prism are seen, the first of said two images resulting from the ordinary ray and the second of said two images resulting from the extraordinary ray, the separation between said two images being dependent upon the difference between the respective indices of refraction of said prism for the ordinary and the extraordinary rays, said prism being so positioned with respect to the slit that said two images are parallel to each other and to the image of the slit seen as viewed through the fluid alone, estimating the distance between said first of said two images and the image of the slit as seen through the fluid alone, and using the distance between said first of said two images and said second of said two images as a unit of measure in estimating the distance between said first of said two images and said image of the slit as seen through the fluid alone.

22. The method of comparing the index of refraction of a fluid with that of a birefringent material which comprises projecting images of an illuminated slit onto a screen by passing light rays both directly through a quantity of said fluid and through both a quantity of said fluid and a prism of said birefringent material, a light ray incident upon said prism of birefringent material producing an ordinary refracted ray and an extraordinary refracted ray whereby two images of said illuminated slit are projected by passage of the light rays through said prism, the first of said two images resulting from the ordinary ray and the second of said two images resulting from the extraordinary ray, the separation between said two images being dependent upon the difference between the respective indices of refraction of said prism for the ordinary and the extraordinary rays, said two images being parallel to each other and to the image of the slit projected by passage of the light rays through said quantity of said fluid alone, estimating the distance between said first of said two images and the image of the slit projected by passage of the light rays through said quantity of said fluid alone, and using the distance between said first of said two images and said second of said two images as a unit of measure in estimating the distance between said first of said two images and said image of the slit projected by passage of the light rays through said quantity of said fluid alone.

GERALD W. WILLARD.